May 12, 1959  R. J. EHRET ET AL  2,886,755
SERVOMOTOR SYSTEM CONTROL APPARATUS
Filed May 24, 1955
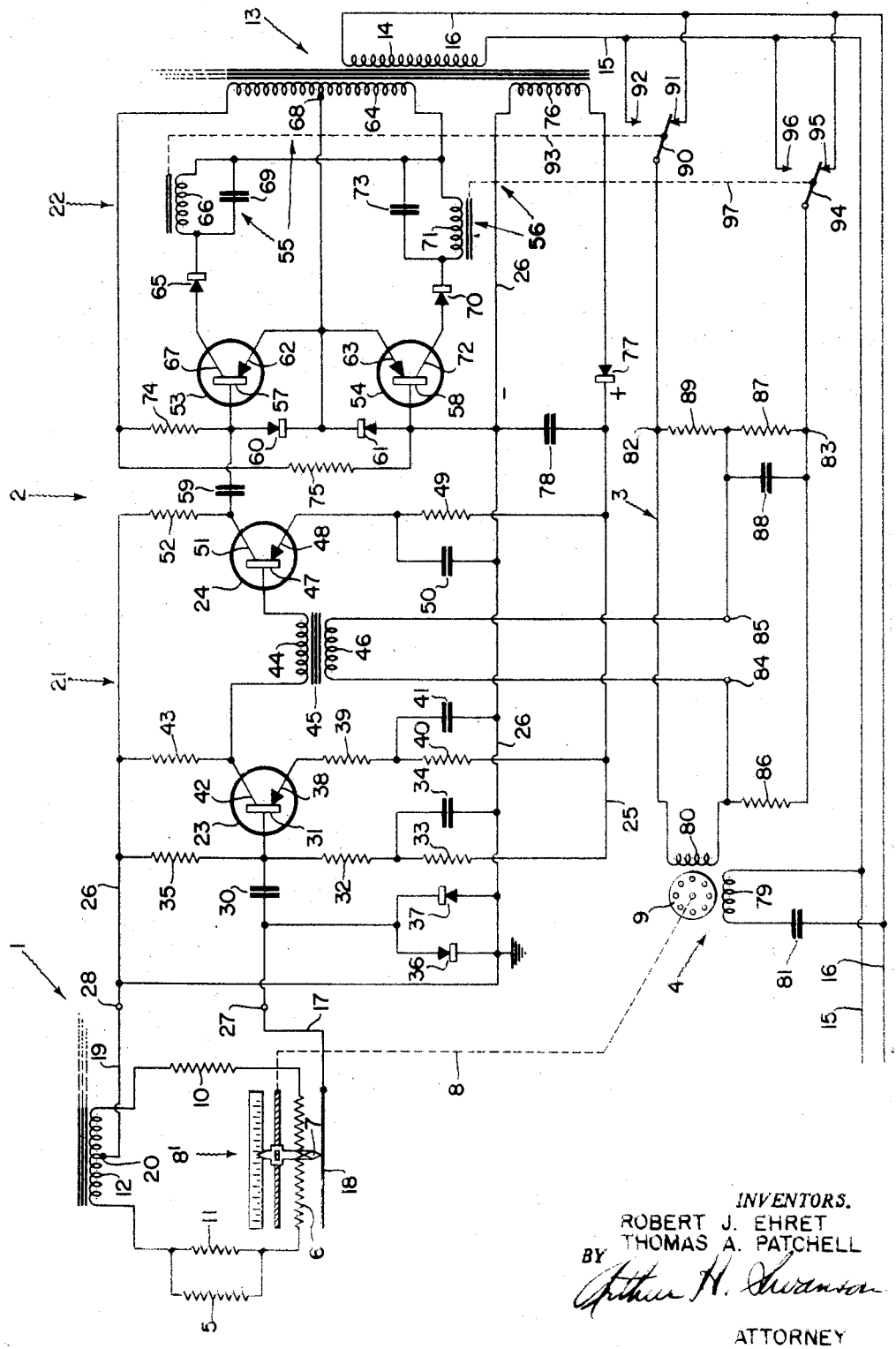
INVENTORS.
ROBERT J. EHRET
THOMAS A. PATCHELL
BY
ATTORNEY United States Patent Office 2,886,755
Patented May 12, 1959

2,886,755

SERVOMOTOR SYSTEM CONTROL APPARATUS

Robert J. Ehret, Palo Alto, Calif., and Thomas A. Patchell, Havertown, Pa., assignors to Minneapolis-Honeywell Regulator Company, Minneapolis, Minn., a corporation of Delaware Application May 24, 1955, Serial No. 510,742

22 Claims. (Cl. 318—29)

The present invention relates generally to anti-hunting control apparatus for electric motors employed to position a load or an element in a predetermined manner, and relates particularly to control apparatus of this type for the rebalancing or follow-up motor of self-balancing apparatus of the kind which employs such a motor to position a rebalancing or follow-up element in the apparatus. Specifically, the invention relates particularly to self-balancing apparatus including motor control means provided with anti-hunting means for minimizing the tendency of the rebalancing motor to overshoot the balance point and to hunt thereabout when performing its rebalancing function.

A general object of the present invention is to provide an improved electric motor control arrangement for motors of the load or element positioning type including novel means for subjecting such motors to an anti-hunting action. A specific object of the invention is to provide such a control arrangement for the control of the reversible electric rebalancing motor in self-balancing apparatus of the type which employs such a motor to position a rebalancing or follow-up element included in the apparatus.

A more specific object of the invention is to provide improved self-balancing apparatus including a novel form of rebalancing motor control means which effects an improved anti-hunting action in its control of the motor, thereby to minimize the tendency of the motor to overshoot or to hunt about the balance point when effecting its apparatus rebalancing operations.

A still more specific object of the invention is to provide apparatus including an anti-hunting motor control arrangement of the type specified which is operative to provide both an anticipatory deenergizing action and a simultaneous dynamic braking action on the rebalancing motor which it controls.

It has long been a problem in the operation of self-balancing and automatic follow-up apparatus of the motor driven type to secure both a rapid rebalancing action and a freedom from motor overshooting and hunting. Moreover, it is well known that such rebalancing motor overshooting and hunting are the inevitable results of the tendency of the motor in such apparatus to continue to rotate, or to coast, after being deenergized by the passing of the rebalancing element through the balance position. Such a motor cannot stop at the instant it is deenergized, unless it is moving at an intolerably slow rate, and cannot merely be deenergized at a fixed distance from the balance point without rendering the apparatus fatally insensitive. Therefore, such a motor has a tendency to continue its adjustment of the rebalancing element after the latter has reached and passed its balance position, and hence tends to overshoot the balance point and repeatedly hunt thereabout.

Numerous anti-hunting arrangements have been proposed in the past for the purpose of permitting a rebalancing or follow-up motor to move to the balance position as rapidly as possible without overshooting this position and/or hunting about it. However, while some of these proposed arrangements have provided satisfactory operation in certain cases, there are many cases involving motor overshooting and hunting problems which have not been satisfactorily taken care of by the known arrangements.

For example, the Harrison Patent No. 2,263,497 and the Harrison et al. Patent No. 2,442,329 disclose anti-hunting motor control arrangements of the feedback type wherein a signal is produced in accordance with the motor operation and is fed back into the apparatus to effect the anticipatory deenergization of the motor. The feedback signal is obtained in these arrangements from a bridge circuit which includes a portion of the motor winding.

However, these arrangements, as well as the others which have been proposed in the past, have not served to provide the degree of anti-hunting action required in many cases. That is, numerous self-balancing and other follow-up devices have such characteristics and such rebalancing speed requirements as to cause the known motor control arrangements, with their known anti-hunting provisions, to be ineffectual in preventing motor overshooting and hunting to the required degree.

Accordingly, it is a specific object of the present invention to provide an improvement in apparatus of the type disclosed in said Harrison and Harrison et al. patents, the improved control arrangement of the present invention being characterized by the inclusion of novel means operative to provide a desirable compound anti-hunting effect not obtainable with the previously known motor controlling arrangements.

An even more specific object of the invention is to provide such a novel motor controlling arrangement including means operative to subject the controlled motor to both a premature deenergizing effect and a simultaneous dynamic braking effect.

A still more specific object of the invention is to provide an improved motor controlling arrangement of the type specified wherein the output of the bridge circuit which includes a portion of the controlled motor windings is fed back into the motor control circuit to oppose the motor control signal therein and hence to effect the premature deenergization of the motor as the position of apparatus balance is approached, and wherein the input to said bridge circuit is advantageously short-circuited automatically under the control of the feedback signal so as to apply a dynamic braking effect to the motor as it is prematurely deenergized. The combined effect of the premature deenergization and simultaneous dynamic braking actions imposed on the controlled motor are effective to prevent, or at least minimize, overshooting and consequent hunting of the motor in its rebalancing of the apparatus.

For the purpose of fulfilling the objects of the present invention just enumerated, the motor controlling arrangement illustrated herein as a preferred embodiment of the invention includes a motor circuit in the form of a bridge circuit which contains in one of its arms the control winding of the motor to be controlled. This motor circuit has an input connection which is supplied with supply line voltage through the contacts of a pair of relays which is included in the output portion of a motor control circuit. The error signal from a measuring or comparison circuit is amplified to produce a motor control signal in the motor control circuit, and the selective operation of the two relays is controlled in accordance with the magnitude and sense of this motor control signal as necessary to cause the motor to rotate in the proper direction and to the extent necessary to rebalance the measuring circuit and hence reduce the error signal and motor control signal to zero.

When the motor is at rest, the motor bridge circuit is so arranged that its output is zero no matter whether it is energized or not. When the motor is rotating, however, there is produced in its output connection a bridge output or motor signal having a magnitude and sense which are respectively dependent upon the speed and direction of rotation of the motor. This motor signal is fed back to the motor control circuit in such a manner as to oppose the error signal which was responsible for the motor rotation. The effect of this motor or feedback signal is, therefore, to deenergize prematurely the relay which was producing the motor rotation, thereby causing the motor to be deenergized prematurely. As the motor is thus deenergized by the operation of the relay, this operation causes the relays to short-circuit the input of the bridge, thereby substantially short-circuiting the motor winding and subjecting the motor to a desirable dynamic braking action in addition to the deenergizing effect provided by the feedback signal. These two effects thus cooperate as necessary to bring the motor rotation to a stop just as the measuring circuit comes into balance, thereby preventing the motor from overshooting the balance point, and hence minimizing the tendency of the motor to hunt about the balance point.

Once the motor is at rest, there is no output signal from the motor bridge circuit, even at the instant in which the appearance of a motor control signal, due to a new error signal, causes the energization of the appropriate one of the relays to energize the motor control winding from the supply voltage source. This assures a maximum sensitivity for the apparatus with a minimum dead spot, and permits the rebalancing motor to detect and correct even minute error signals, since the motor signal is not fed back to the motor control circuit until the motor rotation is appreciable, and since the deenergization and dynamic braking effects are not applied to the motor until the motor control circuit detects no motor control signal and hence deenergizes both of the relays.

The various features of novelty which characterize our invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of our invention.

The single figure of the drawing illustrates a preferred embodiment of the present invention wherein the novel anti-hunting motor control arrangement thereof controls the operation of the rebalancing motor in a self-balancing measuring device.

GENERAL DESCRIPTION

The illustrated embodiment of the present invention as shown in the drawing is a self-balancing bridge type of temperature measuring device including a balanceable measuring circuit 1, a motor control circuit 2, a motor bridge circuit 3, and a rebalancing motor 4. The measuring circuit 1 includes a temperature responsive resistance thermometer element 5, which is adapted to be exposed to the temperature to be measured, and a rebalancing slidewire resistor 6 whose sliding contact 7 is mechanically coupled by a suitable linkage and contact positioning mechanism 8 to rotor 9 of the rebalancing motor 4. The output of the measuring circuit 1 is connected to the input of the motor control circuit 2, the relay contacts of which control the energization of the motor bridge circuit 3, and hence control the energization of the motor 4 in the performance of its measuring circuit rebalancing function.

In the general operation of the measuring device shown in the drawing, there is no output signal or error signal from the measuring circuit 1 when the temperature of the resistance thermometer element 5 corresponds to the position of the rebalancing contact 7. Upon the occurrence of a change in the temperature of the element 5, an error signal is developed by the circuit 1 and is applied to the circuit 2, which then effects the selective rotation of the motor 4 in the proper direction and to the proper extent to cause the rebalancing contact 7 to be moved along the resistor 6 in the direction and to the extent necessary to rebalance the measuring circuit. When this has occurred, the error signal from the measuring circuit will have been reduced to zero, the motor 4 will be prevented from further rotation, and the contact 7 will be maintained in the balance position indicative of the new value of the temperature of the element 5.

For providing an indication of the value of the temperature of the element 5 as measured by the apparatus, a scale and pointer combination 8' is arranged to cooperate with the rebalancing contact 7 in the usual manner as shown in the drawing. By virtue of the rebalancing movements imparted to the contact 7, the pointer is positioned along the scale in accordance with the temperature of the element 5.

The measuring circuit 1

In addition to the resistance thermometer element 5 and the rebalancing slidewire 6, the measuring circuit 1 includes a resistor 10, a shunting resistor 11 for the element 5, and a secondary winding 12 of a transformer 13 having a primary winding 14 which is connected across alternating current supply conductors 15 and 16. The measuring circuit resistors 6, 10, and 11 are connected in series across the winding 12 in a circuit which can be traced from the left-hand end terminal of the winding 12 through the parallel connected resistors 5 and 11, the rebalancing resistor 6, and the resistor 10 to the right-hand end terminal of the winding 12.

The measuring circuit 1 also has a pair of output conductors consisting of a conductor 17 connected through a collector bar 18 to the adjustable contact 7 of the rebalancing resistor 6, and a conductor 19 connected to a center-tap connection 20 on the winding 12.

It is apparent that the measuring circuit 1 is a form of bridge circuit having its energizing terminals connected across the transformer secondary winding 12, and having its output conductors 17 and 19 connected between diagonally opposite points of the circuit. In such a circuit, the position of the contact 7 along the resistor 6 for circuit balance and zero bridge output or error voltage between the conductors 17 and 19 is a measure of the resistance of the element 5, and hence of the temperature to which the element 5 is exposed. When the circuit becomes unbalanced, as by a change in the temperature and resistance of the element 5 from the value for which the circuit was balanced, there is produced between the bridge output conductors 17 and 19 an alternating voltage error signal of a phase and magnitude respectively dependent upon the direction and extent of circuit unbalance. It is this error signal which, through the motor control circuit 2, causes the operation of the motor 4 and the repositioning of the rebalancing contact 7 as necessary to rebalance the measuring circuit 1 and reduce the error signal to zero in each rebalancing operation.

The motor control circuit 2

The motor control circuit 2 comprises a signal amplifier portion 21 and a phase discriminating motor control portion 22. Each of these portions is shown as being of the transistor type, but it is to be understood that this showing has been made merely by way of illustration and example, and that the invention disclosed and claimed herein is not restricted for use in or with transistorized circuitry. For example, the transistor circuitry of the amplifier 21 and phase discriminator 22 may be replaced by electron tube circuitry, of the general type shown in the aforementioned patents, without changing the nature and operation of the invention.

The signal amplifier 21

As shown in the drawing, the amplifier 21 is a two stage, common emitter transistor amplifier of the type which is disclosed and claimed in a copending application Serial No. 410,161 which was filed on February 15, 1954, by Robert J. Ehret, one of the inventors herein, now Patent No. 2,822,434. The amplifier 21 includes a first stage transistor 23, a second stage transistor 24, a positive supply voltage conductor 25, and a negative supply voltage conductor 26. Each of the transistors 23 and 24 includes the usual emitter, collector, and base elements. The amplifier 21 also includes input terminals 27 and 28, and other components whose connection in the circuit will be described as the description of the amplifier 21 progresses.

The amplifier input terminal 27 is connected through an input coupling condenser 30 to the base 31 of the tranhsistor 23. The base 31 is also connected through series connected resistors 32 and 33 to the positive supply voltage conductor 25. A condenser 34 connects the junction between the resistors 32 and 33 to the negative and grounded supply voltage conductor 26. The conductor 26 is also connected to the remaining amplifier input terminal 28, and is connected through a resistor 35 to the base 31 of the transistor 23.

The input terminal 27 is connected to the conductor 26 through a pair of parallel connected signal limiting diode rectifiers 36 and 37 which are oppositely poled as shown. The purpose of these limiting diodes is to prevent any blocking of the amplifier 21 under extreme conditions of measuring circuit unbalance.

The emitter 38 of the transistor 23 is connected through series connected resistors 39 and 40 to the positive conductor 25. A condenser 41 connects the junction between the resistors 39 and 40 to the negative conductor 26. The collector 42 of the transistor 23 is connected through a resistor 43 to the conductor 26.

The transistor 23 of the first amplifier stage is coupled to the transistor 24 of the second amplifier stage through a secondary winding 44 of a feedback transformer 45 having a primary winding 46 which is connected to the output of the motor bridge circuit 3 as will be described hereinafter. Specifically, the winding 44 is connected between the collector 42 of the transistor 23 and the base 47 of the transistor 24. The emitter 48 of the latter is connected through a resistor 49 to the positive conductor 25, and is connected to the negative conductor 26 through a condenser 50. The collector 51 of the transistor 24 is connected through a resistor 52 to the negative conductor 26.

As will be readily apparent, the output of the amplifier 21 appears across the resistor 52. Neglecting any feedback signal introduced by way of the transformer 45, the amplifier output appearing across the resistor 52 will be the amplified version of any alternating voltage error signal applied between the amplifier input terminals 27 and 28. Since the details of the operation of the amplifier 21 form no part of the present invention, and since the operation of this type of amplifier is fully described in the aforementioned copending application, no detailed description of the manner in which the amplifier 21 amplifies its input signal to produce an output signal across the resistor 52 is necessary herein.

The phase discriminator 22

The output of the amplifier portion 21 is a motor control signal which is applied to the input of the phase discriminator and motor control portion 22. The portion 22 will be described only briefly herein, since it is disclosed, described, and claimed in a copending application Serial No. 450,191 which was filed on August 16, 1954, by Thomas A. Patchell, one of the inventors herein.

The phase discriminator 22 includes transistors 53 and 54, relays 55 and 56, and other components whose connections and functions will be described as the description of the apparatus proceeds. Each of the transistors 53 and 54 includes the usual emitter, collector, and base elements, and each of the relays 55 and 56 includes the usual operating winding and associated contacts.

The input to the phase discriminator 22 is applied between the base 57 of the transistor 53 and the base 58 of the transistor 54. To this end, the lower end terminal of the amplifier output resistor 52 is connected by a coupling condenser 59 to the base 57, while the upper end terminal of the output resistor 52 is connected by way of the conductor 26 directly to the base 58. It is in this manner that the output of the amplifier 21 is applied to the input of the phase discriminator 22.

The input signal to the phase discriminator 22 is routed by means of signal routing diode rectifiers 60 and 61 to one or the other of the transistors 53 and 54, depending upon the instantaneous polarity of the input signal. To this end, the diode 60 is connected between the base 57 of the transistor 53 and the emitter 62 thereof, while the diode 61 is connected between the base 58 of the transistor 54 and the emitter 63 thereof. Also, the emitters 62 and 63 are connected together. By virtue of these connections, the input signal to the phase discriminator is routed by the diodes 60 and 61 through one transistor emitter-base circuit or the other, depending upon the instantaneous polarity of the base 57 with respect to the base 58.

A secondary winding 64 of the aforementioned transformer 13 supplies energizing and biasing voltage to the phase discriminator 22. Thus, the collector-emitter or output circuit of the transistor 53 is connected across the lower portion of the winding 64 by a circuit including a blocking diode rectifier 65 and the operating winding 66 of the relay 55. This circuit can be traced from the collector 67 of the transistor 53 through the diode 65 and the relay winding 66 to the lower end terminal of the winding 64, and through the lower portion of the latter to a tap connection 68 which is connected to the connected emitters 62 and 63. A condenser 69 is connected in parallel with the relay winding 66 in the usual manner.

The collector-emitter circuit of the transistor 54 is also energized from the lower portion of the transformer secondary winding 64, being connected across the latter in series with a blocking diode rectifier 70 and the operating winding 71 of the relay 56. This circuit can be traced from the collector 72 of the transistor 54 through the diode 70 and the relay winding 71 to the lower end terminal of the winding 64, and through the lower portion of the latter to the emitters 62 and 63 by way of the tap connection 68. A condenser 73 is connected in parallel with the relay winding 71.

Emitter-base bias for the transistors 53 and 54 is supplied by the upper portion of the transformer secondary winding 64. To this end, the upper end terminal of the winding 64 is connected through a resistor 74 to the base 57, and is connected through a resistor 75 to the base 58. Since the emitters 62 and 63 are connected to the tap 68 on the winding 64, the connections just described provide for the biasing of the transistors 53 and 54 as explained in detail in the last mentioned copending application.

As will be apparent from the connections just described, the presence of a motor control signal across the resistor 52 will cause one or the other of the relay windings 66 and 71 to be operatively energized, depending upon the phase of the motor control signal with respect to the phase of the voltage across the secondary winding 64. When there is no signal across the resistor 52, neither of the relay windings 66 and 71 is operatively energized.

The energizing voltage supplied between the conductors 25 and 26 for the amplifier 21 is provided by a secondary winding 76 on the aforementioned transformer 13. One end terminal of the winding 76 is directly connected to the negative supply conductor 26, while the other end terminal of the winding 76 is connected through a rectifier 77 to the positive supply conductor 25. A filter condenser 78 is connected between the conductors 25 and 26 in the usual manner.

The motor 4

The rebalancing motor 4 is a two-phase induction motor of a well known type which is disclosed, for example, in the Wills Patent No. 2,423,540. In addition to the rotor 9, the motor 4 includes a power winding 79 and a control winding 80. The power winding 79 is connected in series with a phase shifting condenser 81 across the alternating supply voltage conductors 15 and 16. The value of the condenser 81 is so chosen as to produce with the control winding 79 a substantially series resonant circuit, whereby the phase of the voltage across the winding 79 is such as to cause this voltage to lead by substantially 90° the voltage across the supply conductors 15 and 16. With the motor power winding 79 energized as just described, the rotor 9 will be caused to rotate in one direction when the control winding 80 is energized with voltage which is in phase with the supply voltage between conductors 15 and 16. Similarly, the rotor 9 will be caused to rotate in the opposite direction when the control winding 80 is energized with voltage which is 180° out of phase with the supply voltage. Since this is the usual operation for a conventional two-phase motor of the type shown, no further explanation concerning this operation is deemed to be necessary herein.

The bridge circuit 3

The motor bridge circuit 3 is provided with input or energizing terminals 82 and 83, and with output terminals 84 and 85. One bridge arm comprises the motor control winding 80 connected between the input terminal 82 and the output terminal 84. A second bridge arm comprises a resistor 86 connected between the input terminal 83 and the output terminal 84. A third bridge arm comprises a resistor 87 connected in parallel with a condenser 88 between the input terminal 83 and the output terminal 85. A fourth and last bridge arm comprises a resistor 89 connected between the input terminal 82 and the output terminal 85. The bridge input terminals 82 and 83 are arranged to be selectively connected in one or another manner to the supply conductors 15 and 16 by the contacts of the motor control relays 55 and 56 as will be explained hereinafter. The bridge output terminals 84 and 85 are connected across the primary winding 46 of the feedback transformer 45 included in the voltage amplifier 21, whereby any bridge output signal appearing between the terminals 84 and 85 is fed into the amplifier 21 as a negative feedback anticipatory signal as will be further discussed below.

Relay contact connections

In addition to the operating winding 66, the relay 55 includes a movable contact 90 which cooperates with a normally closed stationary contact 91 and a normally open stationary contact 92. A linkage 93 controls the position of the contact 90 in accordance with the operative energization of the winding 66. Thus, when the winding 66, and hence the relay 55, are not operatively energized, the contact 90 engages only the normally closed contact 91. When the winding 66 is operatively energized, the contact 90 engages only the normally open contact 92.

Similarly, the relay 56 includes a movable contact 94, a normally closed stationary contact 95, and a normally open stationary contact 96. The operative energization of the relay winding 71 controls the position of the contact 94 through a linkage 97. Thus, when the winding 71, and hence the relay 56, are not operatively energized, the contact 94 engages only the normally closed contact 95, but when the winding 71 is operatively energized, contact 94 engages only the normally open contact 96.

In order that the relay contacts just described can effect the selective connection of the motor bridge input terminals 82 and 83 to the supply conductors 15 and 16, the contact 90 is connected to the bridge input terminal 82, while the contact 94 is connected to the bridge input terminal 83. Also, the normally open contacts 92 and 96 are connected together to the supply conductor 15, while the normally closed contacts 91 and 95 are connected together to the supply conductor 16.

Motor energization

By virtue of the foregoing connections, the motor control winding 80 is supplied with energizing voltage which is either in phase with the supply voltage of the conductors 15 and 16 or is 180° out of phase with this supply voltage, depending upon which of the relays 55 and 56 is operatively energized. Specifically, when the relay 55 alone is operatively energized, as occurs when a motor control signal of one phase appears across the resistor 52, the motor control winding 80 is supplied with energizing voltage which will be said to be in phase with the supply voltage between the conductors 15 and 16. The circuit supplying this energizing voltage to the control winding 80 can be traced from the supply conductor 15 through the then closed contacts 90 and 92 to the bridge input terminal 82, then to the upper end terminal of the winding 80, then through the winding 80 and the resistor 86 to the bridge input terminal 83, and finally from the latter through the then closed contacts 94 and 95 to the remaining supply conductor 16.

Conversely, when the relay 56 alone is operatively energized, as occurs when a signal of opposite phase appears across the resistor 52, the motor control winding 80 is supplied with energizing voltage which is 180° out of phase with respect to the voltage applied to it when only the relay 55 is operatively energized. It can thus be said that the supply voltage applied across the control winding 80 by the energization of the relay 56 alone is 180° out of phase with the supply voltage between the conductors 15 and 16. The circuit supplying this voltage to the control winding 80 can be traced from the supply conductor 16 through the then clsed contacts 90 and 91 to the bridge input terminal 82, then to the upper end terminal of the control winding 80, then through the winding 80 and the resistor 86 to the bridge input terminal 83, and finally from the latter through the then closed contacts 94 and 96 to the remaining supply conductor 15.

It is seen from the foregoing that the selective operation of one or the other of the relays 55 and 56 causes the motor control winding 80 to be supplied with energizing voltage of one phase or the opposite phase. This causes respective rotation of the motor rotor 9 in one direction or the other. The resistance of the resistor 86 is chosen to be small relative to the resistance of the motor winding 80, whereby essentially the full value of the supply voltage is applied to the winding 80 whenever either of the relays 55 and 56 is operatively energized.

When neither of the relays 55 and 56 is operatively energized, as occurs when no motor control signal is present across the resistor 52, no energizing voltage is applied to the motor control winding 80, and the rotor 9 is not urged for rotation in either direction. In fact, simultaneous deenergization of both of the relays 55 and 56 causes the winding 80 to be effectively short circuited through the normally closed relay contacts, whereby the motor rotor 9, if rotating, is subjected to a desirable dynamic braking action as will be discussed further hereinafter. This braking circuit can be traced from the upper end terminal of the winding 80 through the normally closed contacts 90 and 91 to the supply conductor 16, and thence through the normally closed contacts 94 and 95 and the resistor 86 back to the lower end terminal of the winding 80. Since the resistor 86 has a desirably low resistance as previously noted, the presence of the normally closed relay contacts 90, 91, 94, and 95 presents a virtual short circuit across the motor control winding 80 when neither relay is operatively energized.

The motor bridge circuit 3 is so arranged, by the selection of the values of its components, that there is no bridge output signal applied across the feedback transformer primary winding 46 when the motor rotor 9 is stationary, even though the motor windings 79 and 80 may be energized. Thus, when the rotor 9 is mechanically stalled, there is no feedback signal applied to the amplifier 21, even though the motor is energized for rotation.

When the motor is running, however, a voltage is produced across the transformer winding 46 due to the E.M.F. generated in the motor control winding 80. This voltage impressed on the winding 46 is proportional in magnitude to the speed of rotation of the rotor 9, and is of a phase dependent upon the direction of motor rotation.

By the proper phasing of the feedback transformer 45, the motor bridge output signal impressed on the primary winding 46 is fed into the amplifier 21 by the secondary winding 44 in phase opposition to the error signal in the amplifier at that point which was responsible for the motor rotation producing the signal being fed back. The introduction of this feedback signal into the amplifier 21 results in a substantial reduction in the magnitude of the motor control signal across the resistor 52, and effects the premature deenergization of the relay responsible for the motor rotation. Thus, the feedback signal provides an anticipatory effect and acts to prevent overshooting and hunting of the motor 4 as will be further explained below in connection with a detailed description of the typical operation of the disclosed apparatus.

*Operation of the apparatus*

As an illustration of the operation of the apparatus which has been described herein, a typical case will be described. Thus, let it be assumed at the start that the measuring circuit 1 is in the balanced condition, with the motor 4 stationary. There is then no error signal between th terminals 27 and 28, no feedback signal across the feedback transformer secondary winding 44, and no motor control signal across the resistor 52. Accordingly, neither of the relays 55 and 56 is energized, and there is thus no energizing voltage applied to the motor control winding 80.

Let it now be assumed that a decrease occurs in the temperature to which the element 5 is exposed. Assuming a negative temperature coefficient of resistance for the element 5, the assumed decrease in temperature produces an increase in the resistance of the element 5. This causes the measuring circuit 1 to become unbalanced, and it will be necessary for the contact 7 to be moved to the left or down-scale in order to bring the measuring circuit back to the balanced condition and to indicate a measure of the assumed temperature decrease.

The resulting down-scale error signal produced between the terminals 27 and 28 by the measuring circuit unbalance is amplified by the amplifier 21, and produces a down-scale motor control signal across the resistor 52. This motor control signal will be the true amplified version of the error signal, since there will not as yet have been any rotation of the motor rotor 9, and hence any feedback signal from the bridge 3 across the feedback winding 44.

Assuming that the relay 55 is the down-scale motor control relay, and hence that the energization of this relay energizes the motor control winding 80 for motor operation in the direction to move the rebalancing contact 7 in the down-scale direction, the aforementioned motor control signal across the resistor 52 will have such a phase, due to the phase of the down-scale error signal, as to cause the down-scale relay 55 to be operatively energized. This effects the closure of the relay contacts 90 and 92, which in turn causes the application to the control winding 80 of energizing voltage of the phase of the supply voltage. This produces rotation of the motor rotor 9 in such a direction as to move the contact 7 down-scale in the direction to rebalance the measuring circuit 1.

As the rotor 9 starts to rotate under the influence of the energizing voltage applied across the winding 80, a feedback signal appears across the feedback transformer winding 44 which increases in magnitude as the speed of rotation of the rotor 9 increases. Although this feedback signal is opposite in phase to the error signal then present in the amplifier 21, and hence opposes the error signal and tends to reduce the resulting motor control signal across the resistor 52, such reduction is not substantial at this time, since the error signal is relatively large while the feedback signal is relatively small. Thus, the error signal predominates, and the motor control signal continues to maintain the relay 55 energized so as to cause the continuation of the rebalancing operation of the motor 4.

*Operation in absence of anti-hunting provisions*

As the motor 4 rotates to cause the contact 7 to move toward the balance point or position, the error signal in the amplifier 21 decreases. If no anti-hunting means were provided in the apparatus, this decrease in the error signal would continue until the exact instant at which the contact 7 reached the new point of balance for the measuring circuit. At that instant, the error and motor control signals would drop to zero, the relay 55 would be deenergized, and the application of energizing voltage to the motor control winding 80 would be terminated. Because of the inertia of the rotor 9 and the other moving mechanical portions of the rebalancing linkage, however, the mere removal of the energizing voltage from the control winding 80 would not stop the rotation of the motor or terminate the movement of the contact 7. Instead, the contact 7 would continue to move down-scale past the balance point, thereby causing the measuring circuit 1 to become unbalanced in the opposite direction. This in turn would cause the development of an up-scale error signal and an up-scale motor control signal, which would energize the other or up-scale relay 56 for operation of the motor 4 in the up-scale direction. Thus, the down-scale motion of the contact 7 would finally be arrested, well below the proper balance point, and the contact 7 would be driven up-scale back toward the balance point.

Upon reaching the balance point on this up-scale travel, the contact 7 would again cause momentary balance of the measuring circuit and the accompanying deenergization of the up-scale relay 56, but again the inertia of the moving elements of the rebalancing mechanism would cause the contact 7 to continue up-scale past the balance point, thereby again causing the energization of the down-scale relay 55 and a repetition of the performance just described. Such overshooting and hunting action would normally continue, with progressively decreasing amplitude, until finally terminated by the characteristics of the particular system involved. In some cases, however, such instability would continue indefinitely, preventing the contact 7 from coming to rest at the balance point until the apparatus were entirely deenergized.

Such overshooting and hunting operation is obviously undesirable, since it prevents the apparatus from making a measurement of the particular value to be measured. It is for the purpose of preventing such overshooting and hunting in the apparatus disclosed herein that the latter is provided with the anti-hunting provisions whose operation will now be described.

*Operation with the anti-hunting provisions of the invention*

Returning to the description of the operation of the disclosed apparatus with its anti-hunting provisions, it is noted that the motor 4 is driving the contact 7 downscale toward the balance position, whereby the downscale error signal in the amplifier 21 is decreasing. By this time the motor is operating at substantially full speed, whereby the error signal is decreasing at a maximum rate. However, the attainment of full speed operation by the motor has also caused the feedback signal to attain its maximum amplitude, whereby a point of temporary or apparent balance is reached at which the feedback signal completely opposes and overcomes the error signal and causes the motor control signal across the resistor 52 to be reduced substantially to zero.

At this instant, although the contact 7 has not as yet reached the true balance point, and there is still an error signal applied to the amplifier 21, the disappearance of the motor control signal across the resistor 52 terminates the energization of the relay 55, which immediately causes the opening of the contacts 90 and 92 and the closure of the contacts 90 and 91. This immediately removes the energizing voltage from the motor winding 80, and effectively short-circuits the winding 80 through the two pairs of normally closed relay contacts.

The result of this action is threefold. First, the removal of the energizing voltage from the motor winding 80 removes the driving force from the motor and permits it to slow down under the influence of the friction in the rebalancing mechanism. Secondly, the short-circuiting of the winding 80 produces a dynamic braking effect on the rotor 9 which acts to slow down the rotation of the rotor at a much greater rate than it would merely in the presence of the friction load of the system. Thirdly, the feedback signal across the winding 44 is materially reduced due to the substantial short-circuiting of the winding 80, and due to the rapid reduction in the motor speed.

The direct effect of the reduction in the motor speed is a reduction in the rate at which the contact 7 is being driven toward the true balance point. The direct effect of the substantial reduction in the magnitude of the feedback signal across the transformer winding 44 is to remove the opposition to the error signal which, through decreasing, is still present in the amplifier 21. This diminution in the feedback signal opposing the error signal causes the reappearance of a down-scale motor control signal across the resistor 52, which in turn causes the reenergization of down-scale relay 55 and permits the latter to reapply the down-scale energizing voltage to the motor winding 80 for further drive of the motor 4 in the down-scale direction. This action of the relay contacts not only reenergizes the motor winding 80, but also removes the dynamic braking effect from the motor so as to permit the latter to speed up again in moving the contact 7 further toward the true balance point.

The foregoing relay operation also reestablishes the feedback signal across the transformer winding 44, whereby this signal again opposes the error signal and reduces the motor control signal. Although the error signal is now smaller, due to the intervening rebalancing motion of the contact 7, the rate of decrease of the error signal has been reduced by the previous deenergization and dynamic braking of the motor. Also, the resultant slowtant slowing down of the motor rotation causes the reappearing feedback signal on the winding 44 to be proportionally smaller in magnitude than it was previously. Therefore, the feedback signal again effectively opposes the still decreasing error signal to cause again the disappearance of the motor control signal from the resistor 52, the establishment of a second apparent balance point, and the consequent deenergization of the relay 55. Accordingly, the motor 4 is again deenergized, is subjected to the dynamic braking effect produced by the short-circuiting of the winding 80, and is consequently slowed down appreciably.

Assuming that the foregoing operation has brought the contact 7 almost up to the true balance point on the resistor 6, and that the second deenergizing and braking of the motor has reduced its speed almost to zero, the contact 7 then moves into the true balance position and stops, as the motor comes to rest. Although this reduces the feedback signal to zero, there is no reenergization of the relay 55 and motor 4 since the attainment of measuring circuit balance has simultaneously reduced the error signal to zero. Therefore, the contact 7 comes into the true balance position without overshooting this position or subsequently hunting thereabout.

In the operating example just described, it was assumed that the measuring circuit was brought to balance with only two intervening temporary or apparent balance points and only one reenergization of the relay and motor. In some cases, conditions may be such that three or more apparent balance points will occur during the rebalancing operation, with a corresponding number of deenergizations and reenergizations of the rebalancing motor. Also, in some cases, conditions may be such as to cause the apparatus to come into true balance after only a single anticipatory deenergization of the rebalancing motor. In each instance, however, the apparatus is operative in the manner illustrated above to provide the necessary action on the rebalancing motor to cause the latter to drive the rebalancing contact 7 into the position of true measuring circuit balance without overshoot and subsequent hunting.

If, in the foregoing example of the operation of the subject apparatus, the measuring circuit 1 had been unbalanced by a temperature increase, instead of the assumed temperature decrease, the rebalancing and antihunting operations effected would have been basically the same as those described, except that the rebalancing contact 7 would have been driven up-scale, or to the right, to indicate a measure of the assumed temperature increase. Briefly, the resulting unbalance of the measuring circuit would cause the production of an error signal having a phase opposite to that of the error signal produced by unbalance due to a temperature decrease. This upscale error signal of opposite phase would produce an up-scale motor control signal across the resistor 52, the phase of this signal being opposite to that of the above described down-scale motor control signal. Accordingly, the up-scale relay 56 would be energized instead of the down-scale relay 55, whereby the energizing voltage applied to the motor winding 80 would be opposite in phase to the supply voltage. Therefore, the motor 4 would be energized for rotation in the direction opposite to that previously described, and the contact 7 would be moved in the up-scale direction as necessary to rebalance the measuring circuit 1.

Although under these conditions the error signal present in the amplifier 21 would have a phase opposite to that which it had when the measuring circuit unbalance was due to a temperature decrease, the error signal would still be opposed by the feedback signal from the bridge 3. The reason for this is that the aforementioned reversal in the direction of rotation of the rebalancing motor would cause a reversal in the phase of the feedback signal, whereby the latter would still be in phase opposition to the error signal with its reversed phase. Therefore, no matter in which direction the measuring circuit 1 is unbalanced, the appropriate one of the relays 55 and 56 is energized to cause the rotation of the rebalancing motor in the proper direction to rebalance the measuring circuit, and the feedback signal appearing across the transformer winding 44 is of the proper phase to oppose the error signal at this point in the amplifier 21. Accordingly, the novel anti-hunting provisions which have been described operate properly and in the same manner for both down-scale and up-scale measuring circuit rebalancing operations.

By way of illustration and example, and not by way of limitation, it is noted that an operating embodiment of the present invention constructed as disclosed herein employed components having the following characteristics:

| | |
|---|---|
| Resistor 5 | 470 ohms @ 400° F., 59 K ohms @ 100° F. |
| Resistor 6 | 1900 (approx.) ohms. |
| Resistor 10 | 2813 ohms. |
| Resistor 11 | 3107 ohms. |
| Resistor 32 | 47 K ohms. |
| Resistor 33 | 47 K ohms. |
| Resistor 35 | 18 K ohms. |
| Resistor 39 | 560 ohms. |
| Resistor 40 | 100 K ohms. |
| Resistor 43 | 10 K ohms. |
| Resistor 49 | 100 K ohms. |
| Resistor 52 | 4700 ohms. |
| Resistor 74 | 150 K ohms. |
| Resistor 75 | 150 K ohms. |
| Resistor 86 | 150 ohms. |
| Resistor 87 | 5 K ohms. |
| Resistor 89 | 30 K ohms. |

| | Mfd. |
|---|---|
| Condenser 30 | 20 |
| Condenser 34 | 8 |
| Condenser 41 | 20 |
| Condenser 50 | 25 |
| Condenser 59 | 25 |
| Condenser 69 | 1 |
| Condenser 73 | 1 |
| Condenser 78 | 5 |
| Condenser 81 | 1 |
| Condenser 88 | 1 |

| | |
|---|---|
| Motor 4 | M-H Brown Balancing Motor |

| | Volts |
|---|---|
| Winding 12 | 15 |
| Winding 64 (upper part) | 15 |
| Winding 64 (lower part) | 15 |
| Winding 76 | 40 |

| | |
|---|---|
| Diode 36 | Type 1N126. |
| Diode 37 | Type 1N126. |
| Diode 60 | Type 1N126. |
| Diode 61 | Type 1N126. |
| Diode 65 | Type 1N126. |
| Diode 70 | Type 1N126. |
| Rectifier 77 | I.R.C. Type Y4HP. |
| Transistor 23 | Type 2N34 PNP Junction. |
| Transistor 24 | Type 2N34 PNP Junction. |
| Transistor 53 | Type 2N34 PNP Junction. |
| Transistor 54 | Type 2N34 PNP Junction. |
| Transformer 45 | U.T.C. Type SSO-3. |
| Relay 55 | Sigma No. 90598. |
| Relay 56 | Sigma No. 90598. |
| Voltage 25–26 | 50 volts D.C. |
| Voltage 15–16 | 115 volts, 60 c.p.s. |

Although the present invention has been described herein in connection with a self-balancing temperature measuring device, it is to be understood that it is not intended that the invention be limited to this specific type of device, since the invention is applicable as well to other forms of self-balancing apparatus, and to follow-up, positioning, and controlling systems in general.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. Apparatus comprising a first electrical circuit, means for producing in said circuit a first signal, a device adjustable to reduce said first signal, an electric motor for adjusting said device and having a control winding, a motor circuit including said winding, having an input connection and an output connection, and operative to produce in said output connection a motor signal having a magnitude and sense which are respectively dependent upon the speed and direction of rotation of said motor, a motor control circuit having an output portion connected to the input connection of said motor circuit and selectively controllable in response to the magnitude and sense of a control signal to energize said motor winding for rotation of said motor in one direction or the other depending upon the sense of said control signal, and to deenergize and effectively short-circuit said motor winding to reduce the magnitude of said motor signal and to apply a dynamic braking effect to said motor when the magnitude of said control signal is below a predetermined value, and means to oppose said first signal by said motor signal to derive said control signal for selectively controlling said motor control circuit in accordance with the resultant of said opposed signals.

2. Apparatus as specified in claim 1, wherein said motor control circuit includes electromechanical relay means having operating means responsive to the magnitude and sense of said control signal and having contact means included in said output portion and controlled by said operating means to assume a first condition to apply said braking effect to said motor when the magnitude of said control signal is below said predetermined value, to assume a second condition to energize said motor winding for rotation of said motor in said one direction when said control signal has one sense and has a magnitude above said predetermined value, and to assume a third condition to energize said motor winding for rotation of said motor in said other direction when said control signal has the opposite sense and has a magnitude above said predetermined value.

3. Apparatus as specified in claim 2, wherein said motor circuit is a bridge circuit having a pair of input terminals included in said input connection, having a pair of output terminals included in said output connection, and including said motor winding connected between one of said input terminals and one of said output terminals, a first impedance, having an impedance value which is small compared to the impedance of said winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said impedances are arranged to cause said bridge circuit to be balanced whenever said motor is not rotating, wherein said input terminals are connected to said contact means in said output portion, and wherein said contact means when in said first condition short-circuits said input terminals, when in said second condition connects said input terminals in one sense to a source of motor energizing voltage, and when in said third condition connects said input terminals to said source in the opposite sense.

4. Apparatus as specified in claim 2, including means connecting said motor winding to said contact means through said input connection, and wherein said contact means when in said first condition effectively short-circuits said winding, when in said second condition effectively connects said winding in one sense to a source of motor energizing voltage, and when in said third condition effectively connects said winding to said source in the opposite sense.

5. Apparatus as specified in claim 4, wherein said contact means includes a first movable contact member operative to engage a first contact when said contact means assumes said first or said third condition, and to engage a second contact when said contact means assumes said second condition, and includes a second movable contact member operative to engage a third contact when said contact means assumes said first or said second condition, and to engage a fourth contact when said contact means assumes said third condition, wherein said connecting means connects said motor winding between said first and second movable contact members, wherein said first and third contacts are connected to one of the conductors of said source of motor energizing voltage, and wherein said second and fourth contacts are connected to the other conductor of said source.

6. Apparatus as specified in claim 5, wherein said motor circuit is a bridge circuit having a pair of input terminals included in said input connection, having a pair of output terminals included in said output connection, and including said motor winding connected between one of said input terminals and one of said output terminals, a first impedance, having an impedance value which is small compared to the impedance of said winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said input terminals are respectively connected to said first and second movable contact members, and wherein said impedances are arranged to cause said bridge circuit to be balanced whenever said motor is not rotating.

7. Apparatus comprising a balanceable electrical circuit having an output portion, means connected in said circuit and operative to cause the latter to produce in said output portion an error signal of a magnitude and sense which are respectively dependent upon the extent and direction of unbalance of said circuit, a device connected in said circuit and adjustable to balance the latter and to reduce said error signal, an electric motor mechanically connected to said device for adjusting the latter and having a control winding, a motor circuit including said winding, having an input connection and an output connection, and operative to produce in said output connection a motor signal having a magnitude and sense which are respectively dependent upon the speed and direction of rotation of said motor, a motor control circuit having an output portion connected to the input connection of said motor circuit, having an input portion, and selectively controllable in response to the magnitude and sense of a control signal applied to said input portion to energize said motor winding for rotation of said motor and adjustment of said device in one direction or the other depending upon the sense of said control signal, and to deenergize and effectively short-circuit said motor winding to reduce the magnitude of said motor signal and to apply a dynamic braking effect to said motor when the magnitude of said control signal is below a predetermined value, and means to oppose said error signal by said motor signal to derive said control signal and to apply the latter to said input portion for selectively controlling said motor control circuit in accordance with the resultant of said opposed signals.

8. Apparatus as specified in claim 7, wherein said motor control circuit includes electromechanical relay means having operating means responsive to the magnitude and sense of said control signal and having contact means included in the output portion of said motor control circuit and controlled by said operating means to assume a first condition to apply said braking effect to said motor when the magnitude of said control signal is below said predetermined value, to assume a second condition to energize said motor winding for rotation of said motor in said one direction when said control signal has one sense and has a magnitude above said predetermined value, and to assume a third condition to energize said motor winding for rotation of said motor in said other direction when said control signal has the opposite sense and has a magnitude above said predetermined value.

9. Apparatus as specified in claim 8, wherein said motor circuit is a bridge circuit having a pair of input terminals included in said input connection, having a pair of output terminals included in said output connection, and including said motor winding connected between one of said input terminals and one of said output terminals, a first impedance, having an impedance value which is small compared to the impedance of said winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said impedances are arranged to cause said bridge circuit to be balanced whenever said motor is not rotating, wherein said input terminals are connected to said contact means in said output portion of said motor control circuit, and wherein said contact means when in said first condition short-circuits said input terminals, when in said second condition connects said input terminals in one sense to a source of motor energizing voltage, and when in said third condition connects said input terminals to said source in the opposite sense.

10. Apparatus as specified in claim 8, including means connecting said motor winding to said contact means through said input connection, and wherein said contact means when in said first condition effectively short-circuits said winding, when in said second condition effectively connects said winding in one sense to a source of motor energizing voltage, and when in said third condition effectively connects said winding to said source in the opposite sense.

11. Apparatus as specified in claim 10, wherein said contact means includes a first movable contact member operative to engage a first contact when said contact means assumes said first or said third condition, and to engage a second contact when said contact means assumes said second condition, and includes a second movable contact member operative to engage a third contact when said contact means assumes said first or said second condition, and to engage a fourth contact when said contact means assumes said third condition, wherein said connecting means connects said motor winding between said first and second movable contact members, wherein said first and third contacts are connected to one of the conductors of said source of motor energizing voltage, and wherein said second and fourth contacts are connected to the other conductor of said source.

12. Apparatus as specified in claim 11, wherein said motor circuit is a bridge circuit having a pair of input terminals included in said input connection, having a pair of output terminals included in said output connection, and including said motor winding connected between one of said input terminals and one of said output terminals, a first impedance, having an impedance value which is small compared to the impedance of said winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said input terminals are respectively connected to said first and second movable contact members, and wherein said impedances are arranged to cause said bridge circuit to be balanced whenever said motor is not rotating.

13. Apparatus comprising rotatable electric means having winding means and having a rotor which rotates in accordance with the energization of said winding means, said winding means having induced in at least a portion thereof upon rotation of said rotor a first signal indicative of the speed and direction of said rotation, control means responsive to the difference between said first signal and an input signal and arranged to energize at least a portion of said winding means to produce rotation of said rotor in accordance with the combined effects of said first signal and said input signal when said first signal does not balance said input signal, and means included in said control means for effectively short-circuiting at least a portion of said winding means upon said first signal balancing said input signal.

14. Apparatus comprising rotatable electric means having winding means, circuit means including said winding means, having an output connection, and operative to produce in said output connection a first signal having a magnitude and sense which are respectively dependent upon the speed and direction of rotation of said rotatable means, a control circuit having an output portion connected to said winding means, having an input portion, and selectively controllable in response to the magnitude and sense of a control signal applied to said input portion to energize at least a portion of said winding means for rotation of said rotatable means in one direction or the other depending upon the sense of said control signal, and to deenergize and effectively short-circuit at least a portion of said winding means to apply a dynamic braking effect to said rotatable means when the magnitude of said control signal is below a predetermined value, means to derive said control signal, comprising means operative to oppose said first signal to an error signal, and means operative to apply the resultant of said opposed signals to said input portion as said control signal.

15. Apparatus comprising an electric motor having a control winding, a motor circuit including said winding, having an input connection and an output connection, and operative to produce in said output connection a motor signal having a magnitude and sense which are respectively dependent upon the speed and direction of rotation of said motor, a motor control circuit having an output portion connected to the input connection of said motor circuit, having an input portion, and selectively controllable in response to the magnitude and sense of a control signal applied to said input portion to energize said motor winding for rotation of said motor in one direction or the other depending upon the sense of said control signal, and to deenergize and effectively short-circuit said motor winding to reduce the magnitude of said motor signal and to apply a dynamic braking effect to said motor when the magnitude of said control signal is below a predetermined value, means to derive said control signal, comprising means operative to oppose said motor signal to an error signal which is decreased in magnitude by the rotation of said motor, and means operative to apply the resultant of said opposed motor and error signals to said input portion as said control signal.

16. Apparatus as specified in claim 15, wherein said motor control circuit includes electromechanical relay means having operating means responsive to the magnitude and sense of said control signal and having contact means included in said output portion and controlled by said operating means to assume a first condition to apply said braking effect to said motor when the magnitude of said control signal is below said predetermined value, to assume a second condition to energize said motor winding for rotation of said motor in said one direction when said control signal has one sense and has a magnitude above said predetermined value, and to assume a third condition to energize said motor winding for rotation of said motor in said other direction when said control signal has the opposite sense and has a magnitude above said predetermined value.

17. Apparatus as specified in claim 16, wherein said motor circuit is a bridge circuit having a pair of input terminals included in said input connection, having a pair of output terminals included in said output connection, and including said motor winding connected between one of said input terminals and one of said output terminals, a first impedance, having an impedance value which is small compared to the impedance of said winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said impedances are arranged to cause said bridge circuit to be balanced whenever said motor is not rotating, wherein said input terminals are connected to said contact means in said output portion, and wherein said contact means when in said first condition short-circuits said input terminals, when in said second condition connects said input terminals in one sense to a source of motor energizing voltage, and when in said third condition connects said input terminals to said source in the opposite sense.

18. Apparatus as specified in claim 16, including means connecting said motor winding to said contact means through said input connection, and wherein said contact means when in said first condition effectively short-circuits said winding, when in said second condition effectively connects said winding in one sense to a source of motor energizing voltage, and when in said third condition effectively connects said winding to said source in the opposite sense.

19. Apparatus as specified in claim 18, wherein said contact means includes a first movable contact member operative to engage a first contact when said contact means assumes said first or said third condition, and to engage a second contact when said contact means assumes said second condition, and includes a second movable contact member operative to engage a third contact when said contact means assumes said first or said second condition, and to engage a fourth contact when said contact means assumes said third condition, wherein said connecting means connects said motor winding between said first and second movable contact members, wherein said first and third contacts are connected to one of the conductors of said source of motor energizing voltage, and wherein said second and fourth contacts are connected to the other conductor of said source.

20. Apparatus as specified in claim 19, wherein said motor circuit is a bridge circuit having a pair of input terminals included in said input connection, having a pair of output terminals included in said output connection, and including said motor winding connected between one of said input terminals and one of said output terminals, a first impedance, having an impedance value which is small compared to the impedance of said winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said input terminals are respectively connected to said first and second movable contact members, and wherein said impedances are arranged to cause said bridge circuit to be balanced whenever said motor is not rotating.

21. Apparatus comprising an alternating current motor having a power winding energized from a source of alternating current and having a control winding, a motor circuit including said control winding, having an input connection and an output connection, and operative to produce in said output connection an alternating current motor signal having a magnitude and phase which are respectively dependent upon the speed and direction of rotation of said motor, a motor control circuit including a pair of relays having contacts through which said input connection is selectively connected to said source, said motor control circuit also having an input portion and being selectively controllable in response to the magnitude and phase of an alternating current control signal applied to said input portion to energize only one of said relays to cause said contacts to connect said control winding to said source in a manner resulting in rotation of said motor in one direction when said control signal is of one phase and has a magnitude above a predetermined value, to energize only the other of said relays to cause said contacts to connect said control winding to said source in the opposite manner resulting in rotation of said motor in the opposite direction when said control signal is of opposite phase and has a magnitude above said predetermined value, and to deenergize both of said relays to cause said contacts to interrupt the connection of said control winding to said source and effectively to short-circuit said control winding to reduce the magnitude of said motor signal and to apply a dynamic braking effect to said motor when the magnitude of said control signal is below said predetermined value, means to derive said control signal, comprising means operative to apply to said deriving means an alternating current error signal of a magnitude which is decreased by the rotation of said motor and of a phase corresponding to the direction of rotation of said motor necessary to produce said decrease, means to feed back said motor signal to said deriving means in phase opposition to said error signal therein, and means to apply the resultant of said motor and error signals of opposed phase to said input portion as said control signal.

22. Apparatus as specified in claim 21, wherein said motor circuit is a bridge circuit having a pair of input terminals included in said input connection, having a pair of output terminals included in said output connection, and including said motor control winding connected between one of said input terminals and one of said output terminals, a first impedance, having an impedance value which is small compared to the impedance of said control winding, connected between said one output terminal and the other of said input terminals, a second impedance connected between said one input terminal and the other of said output terminals, and a third impedance connected between said other input terminal and said other output terminal, wherein said motor signal is produced between said output terminals, wherein said impedances are arranged to cause said bridge circuit to be balanced whenever said motor is not rotating, wherein said input terminals are connected to said contacts, and wherein said contacts connect said input terminals to said source in one or the opposite manner to effect said energization of said control winding, and short-circuit said input terminals to effect said short-circuiting of said control winding.

References Cited in the file of this patent
UNITED STATES PATENTS

| | | |
|---|---|---|
| 2,364,486 | Starie et al. | Dec. 5, 1944 |
| 2,429,257 | Bond | Oct. 21, 1947 |
| 2,445,289 | Cherry | July 13, 1948 |
| 2,671,877 | Stewart | Mar. 9, 1954 |
| 2,732,520 | Counalt | Jan. 24, 1956 |